(12) United States Patent
Maelfeyt et al.

(10) Patent No.: US 10,455,769 B2
(45) Date of Patent: Oct. 29, 2019

(54) AGRICULTURAL BALER WITH IMPROVED NEEDLE COUPLING DEVICE

(71) Applicant: CNH Industrial America LLC, New Holland, PA (US)

(72) Inventors: Kenny Maelfeyt, Vlissegem (BE); Sven Monbaliu, Zuienkerke (BE); Bram Willem, Woumen (BE)

(73) Assignee: CNH Industrial America LLC, New Holland, PA (US)

( * ) Notice: Subject to any disclaimer, the term of this patent is extended or adjusted under 35 U.S.C. 154(b) by 209 days.

(21) Appl. No.: 15/712,383

(22) Filed: Sep. 22, 2017

(65) Prior Publication Data

US 2018/0077871 A1 Mar. 22, 2018

(30) Foreign Application Priority Data

Sep. 22, 2016 (BE) .................................. 2016/5713

(51) Int. Cl.
*A01F 15/08* (2006.01)
*A01D 59/06* (2006.01)
*A01F 15/04* (2006.01)
*A01F 15/14* (2006.01)

(52) U.S. Cl.
CPC .......... *A01F 15/0858* (2013.01); *A01D 59/06* (2013.01); *A01F 15/042* (2013.01); *A01F 15/145* (2013.01); *A01F 2015/0866* (2013.01)

(58) Field of Classification Search
CPC ...... A01F 15/12; A01F 15/042; A01F 15/145; A01F 2015/0866; A01F 15/0858; A01D 59/06

USPC ............................ 100/4, 18, 19 R, 23, 33 R
See application file for complete search history.

(56) References Cited

U.S. PATENT DOCUMENTS

| 2,604,844 | A | * | 7/1952 | Hill | ..................... | A01F 15/0858 |
| | | | | | | 100/19 R |
| 2,687,688 | A | * | 8/1954 | Morrison | .............. | A01F 15/042 |
| | | | | | | 100/190 |
| 3,895,571 | A | * | 7/1975 | Freeman | ............. | A01F 15/0825 |
| | | | | | | 100/19 R |
| 4,117,775 | A | * | 10/1978 | White | ................. | A01F 15/0858 |
| | | | | | | 100/19 R |

(Continued)

FOREIGN PATENT DOCUMENTS

| EP | 0883986 A1 | 12/1998 |
| WO | 2014060245 A1 | 4/2014 |

*Primary Examiner* — Jimmy T Nguyen
(74) *Attorney, Agent, or Firm* — Peter K. Zacharias; Patrick M. Sheldrake

(57) ABSTRACT

A baler including a bale chamber; a plunger configured to compress crop material in the bale chamber in order to form a bale; a needle yoke with a plurality of needles configured to deliver twine through the bale chamber; a plurality of knotters configured to receive the twine from the plurality of needles; a bale length measurement and trigger device configured to measure the length of the bale in the bale chamber and to generate a trigger when a predetermined length is reached; a driving shaft located above the bale chamber and extending in a traverse direction of the baler; a needle coupling device between the driving shaft and the needle yoke, the needle coupling device being configured for moving the needle yoke from a rest position to a twine delivery position and back, when the bale length measurement and trigger device generates a trigger.

20 Claims, 12 Drawing Sheets

(56) References Cited

U.S. PATENT DOCUMENTS

| | | | |
|---|---|---|---|
| 5,782,175 A * | 7/1998 | Schrag | A01F 15/0858 100/19 R |
| 7,296,828 B2 | 11/2007 | Schoonheere et al. | |
| 2017/0135285 A1* | 5/2017 | Naaktgeboren | A01F 15/0858 |

* cited by examiner

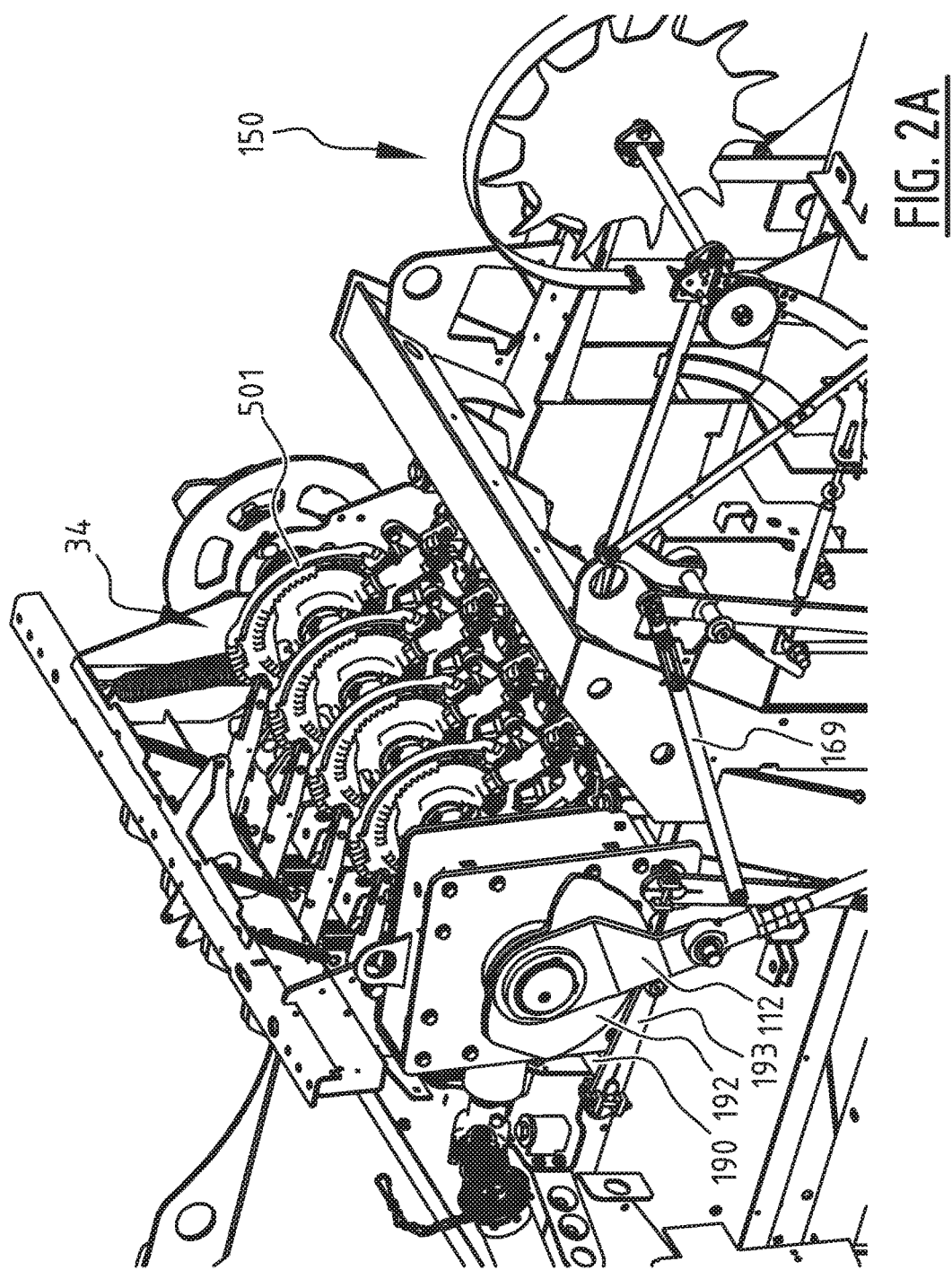

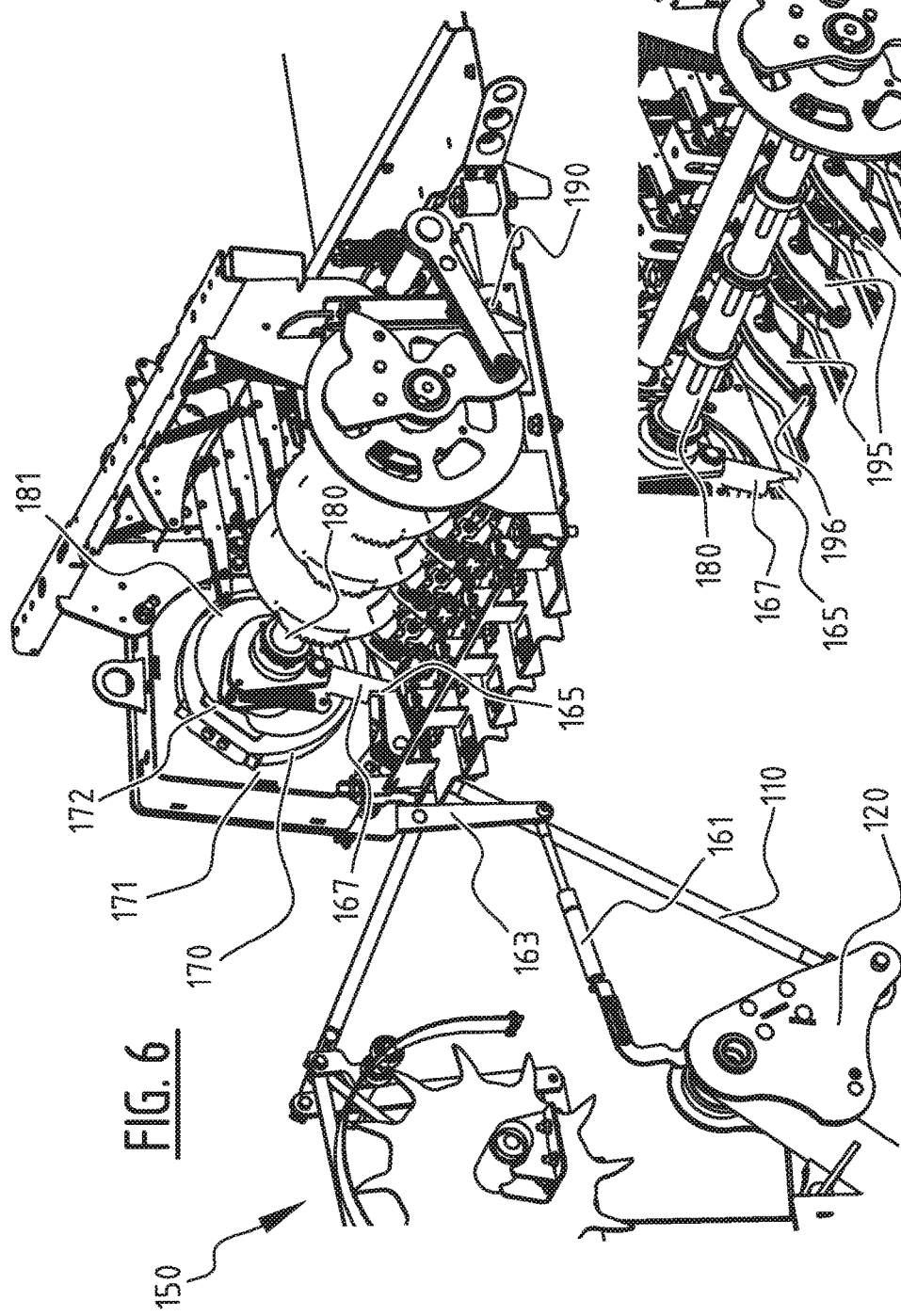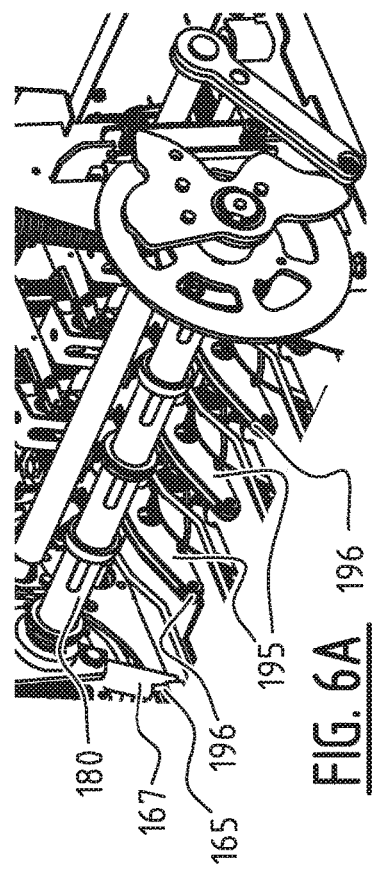

AGRICULTURAL BALER WITH IMPROVED NEEDLE COUPLING DEVICE

FIELD OF THE INVENTION

The present invention relates to agricultural balers, and, more particularly, to balers comprising needles which are driven in function of a bale length measurement.

BACKGROUND OF THE INVENTION

Agricultural harvesting machines, such as balers, are used to consolidate and package cut crop material so as to facilitate the storage and handling of the crop material for later use. A baler, such as a large square baler or round baler, picks up the crop material and forms it into bales. On a large square baler, a pickup unit at the front of the baler gathers the cut and windrowed crop material from the ground. The pickup unit includes a pickup roll, and optionally may include other components such as side shields, stub augers, wind guard, etc. A packer unit is used to move the crop material from the pickup unit to a duct or pre-compression chamber. The packer unit forms a wad of crop within the precompression chamber which is then transferred to a bale chamber. For purposes of discussion, the charge of crop material within the pre-compression chamber will be termed a "wad", and the charge of crop material after being compressed within the main bale chamber will be termed a "flake". Typically such a packer unit includes packer tines or forks to move the crop material from the pickup unit into the pre-compression chamber. Instead of a packer unit it is also known to use a rotor cutter unit which chops the crop material into smaller pieces. A stuffer unit transfers the wad of crop material in charges from the precompression chamber to the bale chamber. Typically such a stuffer unit includes stuffer forks which are used to move the wad of crop material from the pre-compression chamber to the bale chamber, in sequence with the reciprocating action of a plunger within the bale chamber.

When enough flakes have been added and the bale reaches a full (or other predetermined) size, a yoke with a number of needles is activated to transfer twine through the plunger behind the last compressed flake of the bale to knotters which are actuated to wrap and tie twine, cord or the like around the bale while it is still in the bale chamber. The twine is cut and the formed bale is ejected out the back of the baler as a new bale is formed.

In conventional drive systems the knotters are driven by means of a drive shaft—gearbox combination or by a chain drive. When a knotting cycle is required the knotter assembly is coupled through a one-revolution clutch with the main drive which in turn drives the knotter assembly that is synchronized with the plunger. The needles are connected through a crank mechanism with the knotter shaft and hence are driven in a synchronized manner with the knotters. The first part of the sequence of the knotting cycle is used to bring the needles up towards the knotters where, after a certain degree of rotation of the knotter shaft, the different knotter functions start. This first part of the knotter shaft rotation is also used to bring home some functions of the knotter system that were placed in a park position at the end of the second knot sequence and disengagement of the knotter shaft drive since the needles reached home position.

Drive systems for the knotters and the needles typically include a safety/protection device, mostly a shear bolt or other link to break or slip if the drive system encounters a high resistance. Another problem encountered is related to the timing between the needles and the plunger, which if the needles are not withdrawn from the bale chamber in time the plunger with the new, to be compressed wad, will hit the needles causing damage to the needles.

WO2015/197203 in the name of the applicant addresses at least some of these problems and discloses an agricultural baler with a split drive of the needles and knotters by means of a latch system that controls the needle timing and drive and provides an integral safety mechanism. WO2015197203 discloses an agricultural baler including a bale chamber, a plunger configured to compress crop material in the bale chamber, a counter crank, a plurality of needles, and a pivoting latch system. The counter crank is drivingly coupled to the plunger. The plurality of needles is configured to deliver twine through the bale chamber. The pivoting latch system is drivingly coupled to both the counter crank and the needles. A knotter is activated when the needles reach a predetermined position. The latch system ensures that the needles are always withdrawn from the bale by the same drive that powers the plunger. Although such a system works well, a disadvantage is that relatively long connection arms are needed for realizing the coupling between the plunger drive and the needles.

SUMMARY OF THE INVENTION

The object of embodiments of the invention is a more compact baler which allows for a driving of the needles in function of a bale length measurement.

According to a first aspect there is provided a baler comprising a bale chamber, a plunger, a needle yoke, a plurality of knotters, and a bale length measurement and trigger device. The plunger is configured to compress crop material in said bale chamber in order to form a bale. The needle yoke is provided with a plurality of needles configured to deliver twine through the bale chamber. The plurality of knotters is configured to receive the twine from the plurality of needles. The bale length measurement and trigger device is configured to measure the length of the bale in the bale chamber and to generate a trigger when a predetermined length is reached. The bale further comprises a driving shaft located above the bale chamber and extending in a traverse direction of the baler, and a needle coupling device between the driving shaft and the needle yoke, said needle coupling device being configured for moving said needle yoke from a rest position (also called home position) to a twine delivery position and back, when said bale length measurement and trigger device generates a trigger.

By using a driving shaft located above the bale chamber, e.g. the same drive shaft as the drive shaft used for driving the knotters, and by providing a needle coupling device between this driving shaft and the needle yoke, shorter connection arms are needed compared to prior art solutions. Also the needle coupling device can be located closer to the bale length measurement and trigger device. This results in a more compact baler.

Another advantage is that the needle coupling device will ensure that the needles are always withdrawn from the bale chamber by a drive which may be the same as the drive that powers the plurality of knotters.

In a preferred embodiment the driving shaft is coupled with a gear box configured to continuously rotate said driving shaft when the baler is in operation. This allows for a simple construction.

In an exemplary embodiment the needle coupling device comprises a crank arm attached to the driving shaft and co-rotating with the driving shaft; and a plurality of coupling members between the crank arm and the needle yoke. The plurality of coupling members is configured for establishing a coupling between the crank arm and the needle yoke when said bale length measurement and trigger device generates a trigger. Preferably, the plurality of coupling members comprises a drive rod, a connection member and a coupler. The drive rod has a first end pivotally connected the crank arm and a second end. The connection member is pivotally mounted at a first location of the baler around a first fixed pivot axis extending in the transverse direction of the baler. At a second location the connection member is pivotally connected to the second end of the drive rod such that, in operation the connection member is swung back- and forward around said fixed pivot axis by the movement of the drive rod. The coupler is configured to couple the connection member to the needle yoke upon receipt of a trigger. In such an embodiment the length of the drive rod can be relatively short compared to prior art solutions.

In an exemplary embodiment the needle yoke comprises two needle support arms each having a first end and a second end; and a needle carrying rod extending in the transverse direction of the baler and carrying the plurality of needles. The needle carrying rod is mounted between the first ends of the needle support arms; and the second ends of the needle support arms are pivotally mounted around a fixed pivot axis extending in the transverse direction of the baler. Preferably, the first fixed pivot axis of the connection member corresponds with the fixed pivot axis of the second ends of the needle support arms.

In an exemplary embodiment the coupler is a hook member which is pivotally attached to the needle yoke and which is positionable in a first coupling position in which the swinging connection member engages the hook member during swinging and in a second uncoupling position in which the swinging connection member does not engage the hook member during swinging. The bale length measurement and trigger device is then configured to generate a first trigger which positions the hook member in the first coupling position when a predetermined length is reached, and a second trigger which positions the hook member in the second uncoupling position. Preferably, the baler further comprises a trigger coupling device between the swinging connection member and the bale length measurement and trigger device, said trigger coupling device being configured to cause the bale length measurement and trigger device to generate the second trigger. The trigger coupling device may comprise a number of suitably connected rods which are arranged to be moved by the movement of the swinging device such that the movement of the rods causes the second trigger.

In an exemplary embodiment the bale length measurement and trigger device comprises a star wheel configured to rotate as a bale in the bale chamber moves in a longitudinal direction of the baler; and a linkage assembly coupled to said star wheel, said linkage assembly comprising a pivotally mounted trigger arm arranged to trigger a movement of the coupler from an uncoupled position to a coupled position and back. Using a linkage assembly for generating the trigger has the advantage of resulting in a very robust system.

In an exemplary embodiment the baler further comprises a needle holding device configured to hold the needle yoke in the rest position and to allow the needle yoke to be released when movement from the rest position to a twine delivery position and back is required. This needle holding device may be an active or a passive system. An example of a passive system is a needle holding device comprising a spring mounted catch or holder element configured to hold the needle carrying rod of the needle yoke in the rest position and to allow the needle yoke to be pulled out of the rest position against the spring force of the spring mounted catch or holder element.

In an exemplary embodiment the baler further comprises a knotter coupling device between the driving shaft and a drivable knotter shaft coupled to the plurality of knotters, said knotter coupling device being configured to couple the driving shaft to the drivable knotter shaft based on a position of the needle yoke. In that manner the same drive shaft is used for driving the needles and the knotters.

In an exemplary embodiment the knotter coupling device comprises a clutch between the driving shaft and the knotter shaft, and a rod assembly comprising a rod connected to at least one of the two needle support arms of the needle yoke, said rod assembly being configured for engaging the clutch such that the driving shaft is coupled to the knotter shaft. In an exemplary embodiment the clutch is a single revolution clutch configured to be in a disengaged state after having performed a single revolution after the engaging of the clutch. The crank arm for driving the drive rod of the needle coupling device can be provided at one end of the drive shaft such that the crank arm and drive rod move in a plane outside the bale chamber, parallel to a side wall of the bale chamber. The clutch for driving the knotters can be provided at the other end of the drive shaft above the bale chamber.

BRIEF DESCRIPTION OF THE DRAWINGS

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 2A is an enlarged view of a portion of FIG. 2;

FIG. 5 and FIG. 6 are schematic perspective views of an exemplary embodiment of a knotter drive mechanism of a baler according to the present invention; wherein FIG. 5A is a schematic view further elucidating FIGS. 5 and 6, and wherein FIG. 6A is a detailed view of a portion of FIG. 6 in which the knotter discs have been omitted;

DESCRIPTION OF THE DRAWINGS

Figure 1:
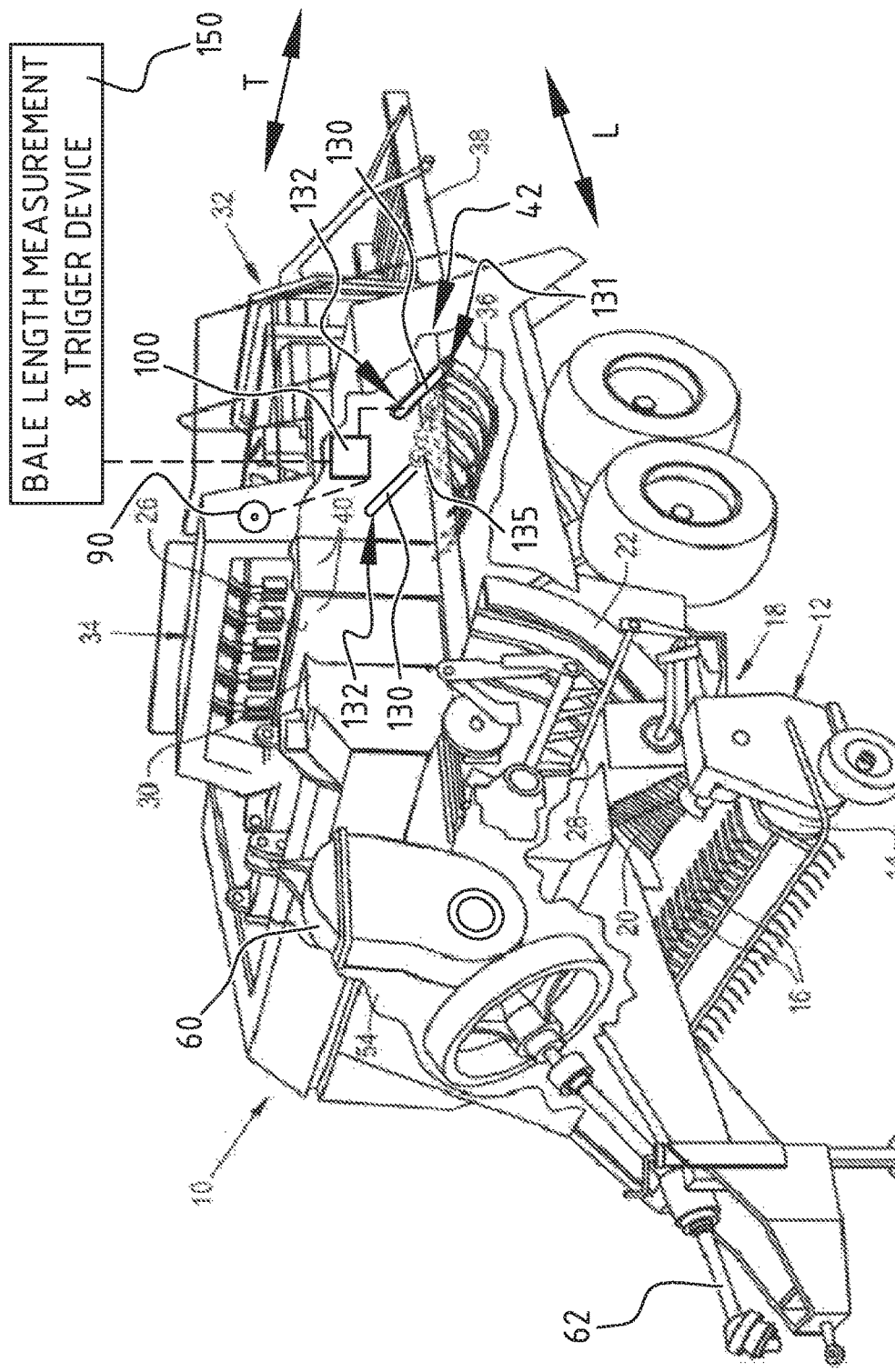
FIG. 1 is a schematic perspective view of an exemplary embodiment of a rectangular baler according to the present invention.

The drawings are only schematic and are non-limiting. In the drawings, the size of some of the elements may be exaggerated and not drawn on scale for illustrative purposes.

Any reference signs in the claims shall not be construed as limiting the scope. In the drawings, the same reference signs refer to the same or analogous elements.

The terms "front", "rear", "forward", "rearward", "left" and "right" used throughout this description are determined with respect to the normal direction of travel of the machine in operation. However, they are not to be construed as limiting terms.

Embodiments of the present invention can be used in agricultural balers for the production of rectangular bales of agricultural material such as hay, straw, silage or similar crop material that previously has been cut, windrowed or swathed, and is picked up from an agricultural field. The produced rectangular bales may have high density, hence a high mass, for example of 500 kg or more.

Referring now to the drawings, and more particularly to FIG. 1, there is shown a schematic perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the precompression chamber 22 reaches a predetermined sensed value, a stuffer unit moves the wad of crop from the pre-compression chamber 22 to a bale chamber 26. The stuffer unit includes stuffer forks 28 which thrust the wad of crop directly in front of a plunger 30, which reciprocates within the bale chamber 26 and compresses the wad of crop into a flake. The stuffer forks 28 return to their original stationary state after the wad of material has been moved into the bale chamber 26.

The plunger 30 compresses the wads of crop into flakes to form a bale and, at the same time, gradually advances the bale toward outlet 32 of the bale chamber 26 in a longitudinal direction L of the baler 10. The bale chamber 26 and the plunger 30 function as the second stage for crop compression. Baler 10 further comprises a needle yoke 42 with a plurality of needles 36 configured to deliver twine through the bale chamber 26 to a plurality of knotters 34. Needle yoke 42 comprises two needle support arms 130, a needle carrying rod 135 extending in the transverse direction T of baler 10 and carrying the plurality of needles 36. Each needle support arm 130 has a first end 131 and a second end 132. Needle carrying rod 135 is mounted between the first ends 131, and the second ends 132 of the needle support arms 130 are pivotally mounted around a fixed pivot axis extending in the transverse direction T of the baler.

When enough flakes have been added and the bale reaches a full or predetermined size (i.e. a predetermined length measured in the longitudinal direction L of the baler), needles 36 of needle yoke 42 bring the lower twine up around the bale through the plunger 30 and the bale chamber 26 and deliver the twine to a plurality of knotters 34 and the tying process then takes place. The plurality of knotters 34 are configured to receive the twine from the plurality of needles 36 and are mounted above the bale chamber 26. After knotting the twine is cut and the formed bale progresses through the bale chamber 26 and is eventually ejected from a discharge chute 38 while the next bale is formed. The bale chamber 26 includes a pair of side walls 40, between which the bale is formed, and between which the needles 36 extend to carry the twine through the bale chamber 26 to the knotters 34.

A gearbox 60 provides actuation of the different parts of the baler 10 that need to be actuated. Gearbox 60 may be actuated by the tractor pulling baler 10 by means of a transmission shaft 62 between the tractor and baler 10. The gearbox 60 provides a direct actuation of a plunger 30. The plunger 30 may for example be connected to the gearbox 60 by means of crank arms and pitman rods (not shown in FIG. 1).

Baler 10 further comprises a bale length measurement and trigger device 150 configured to measure the length of the bale in bale chamber 26 and to generate a trigger when a predetermined length is reached. The bale length measurement and trigger device 150 determines the length of the bale and provides a trigger, e.g. a mechanical trigger in the form of a moving part or an electrical trigger in the form of an electrical signal, when a predetermined length has been met. The bale length measurement and trigger device 150 may be of mechanical and/or electrical construction, or any other adequate construction.

A common driving shaft 90 is used to drive the knotters 34 and the needle yoke 42. The driving shaft 90 is located above the bale chamber 26 and extends in a traverse direction T of the baler 10. The common driving shaft 90 may be suitably connected to main gearbox 60 by means of a PTO shaft and an additional gearbox (not shown). During a baling operation, the driving shaft 90 is continuously rotating at a constant rotational speed, preferably a rotational speed between 250 and 350 revolutions/minute, and e.g. approximately 300 revolutions/minute. A needle coupling device 100 (shown schematically) is provided between the driving shaft 90 and the needle yoke 42. The needle coupling device 100 is configured for moving needle yoke 42 from a rest position to a twine delivery position and back, when bale length measurement and trigger device 150 generates a trigger. A further knotter coupling device (not shown in FIG. 1) is provided for coupling common driving shaft 90 with a knotter shaft carrying knotter discs of the plurality of knotters 34.

Figure 2:
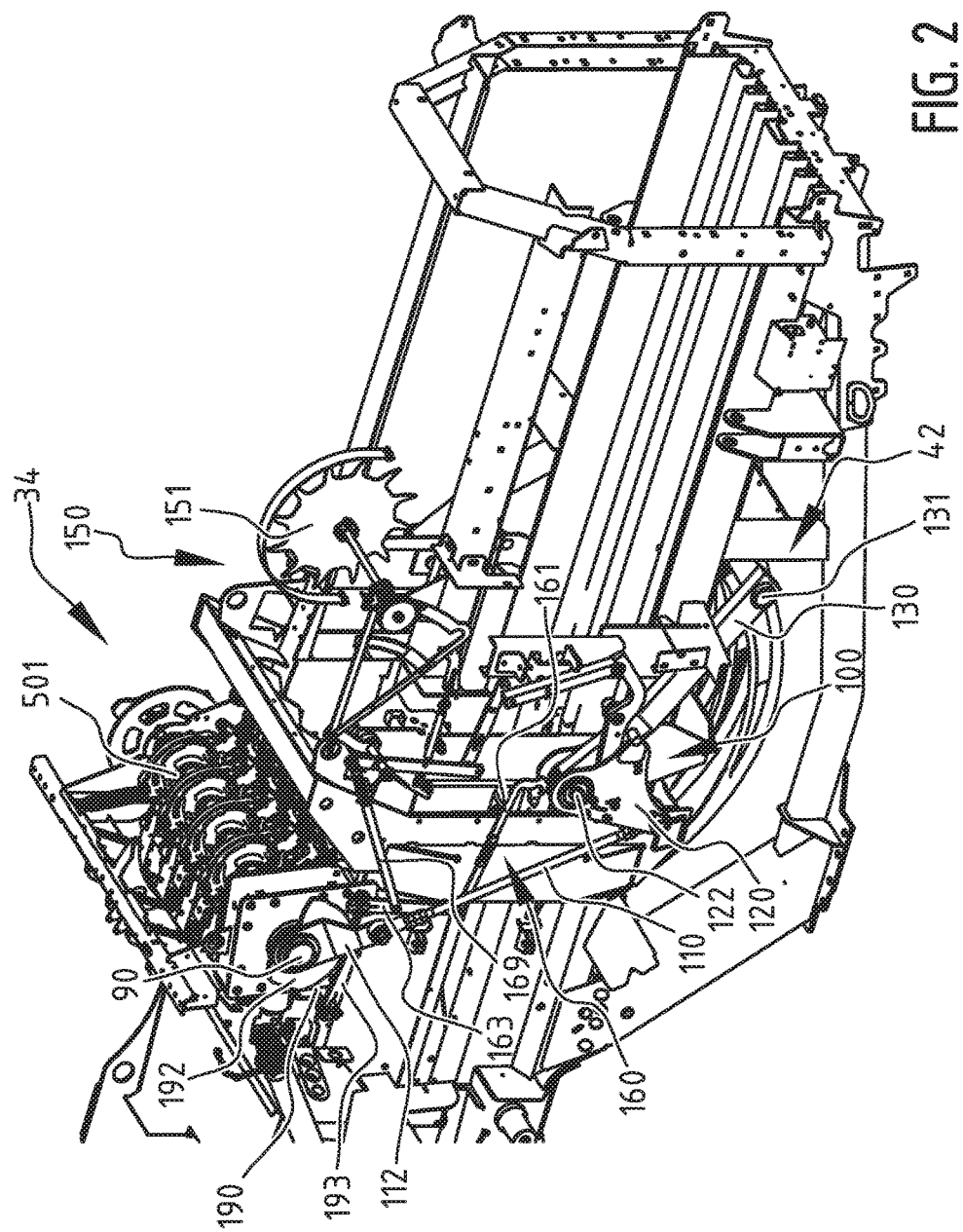
FIG. 2 is a schematic perspective view of an exemplary embodiment of a needle drive mechanism of a baler according to the present invention.
Figure 3:
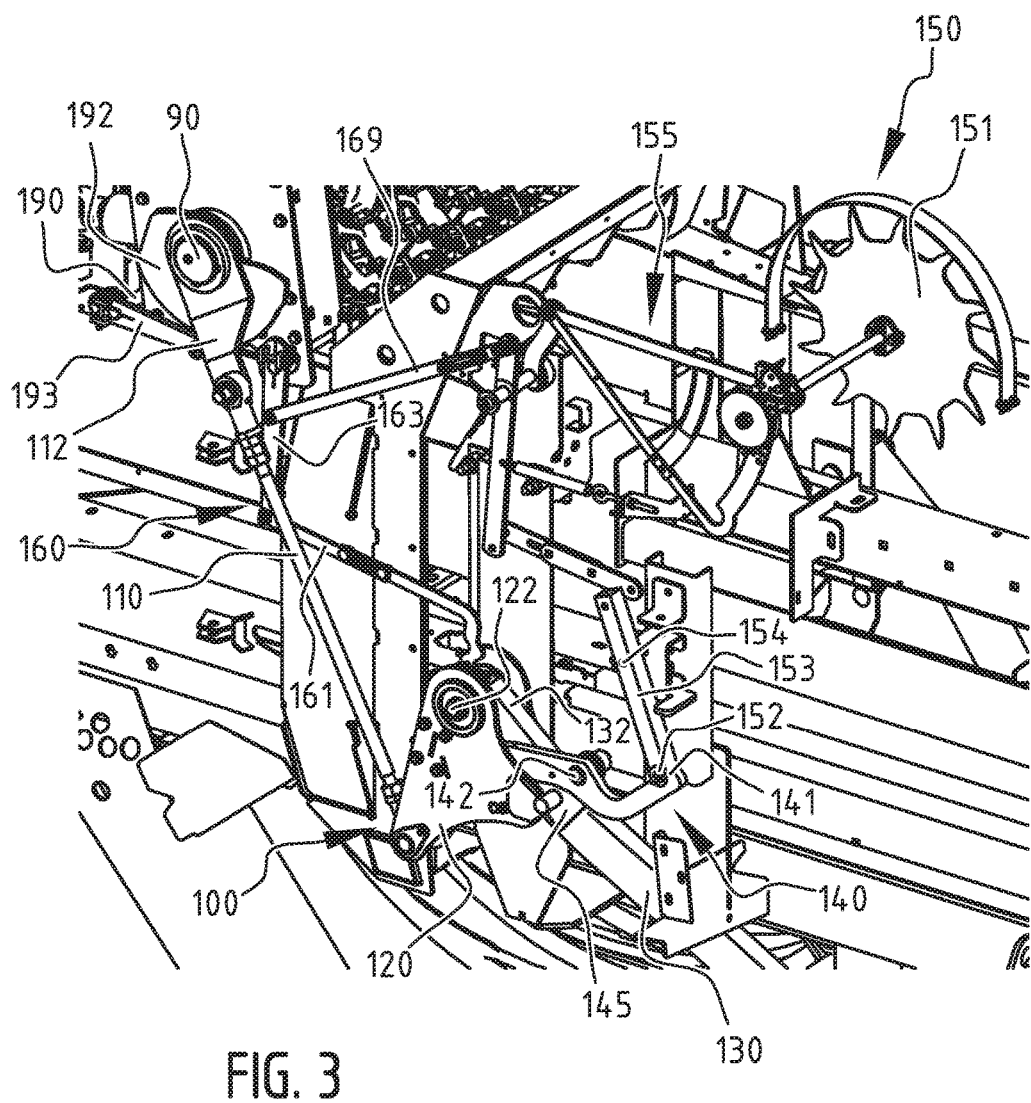
FIG. 3 is a schematic detailed view of a portion of FIG. 2.

An example of a suitable coupling mechanism is shown in FIG. 2, FIG. 2A and FIG. 3. Needle yoke 42 comprises a needle support arm 130 pivotally connected to baler 10 about a pivot axis 122 at the second end 132 of the needle support arm 130. Typically two needle support arms 130 are provided, one at each end of the needle yoke 142. Needle carrying rod 135 carrying the plurality of needles 36 is not visible in FIG. 2 but may be arranged in a similar manner as in FIG. 1 between first ends 131 of the needle support arms 130.

In the embodiment of FIG. 2 and FIG. 3 the needle coupling device 100 comprises a crank arm 112 attached to the driving shaft 90 and co-rotating with the driving shaft 90; and a plurality of coupling members 110, 120, 140, 145 between crank arm 90 and needle yoke 42. The plurality of coupling members 110, 120, 140, 145 is configured for establishing a coupling between crank arm 112 and needle yoke 42 when a bale length measurement and trigger device 150 generates a trigger, as will be further elucidated below.

In operation driving shaft 90 with crank arm 112 is continuously rotated. Crank arm 112 is connected to a first end of a drive rod 110. A connection member 120 is pivotally mounted at a first location around pivot axis 122 extending in the transverse direction T of the baler. In this embodiment pivot axis 122 corresponds with the pivot axis of needle support arms 130, but those pivot axis could also be located at a distance of each other. A second end of drive rod 110 is connected to connection member 120 at a second location. By rotating crank arm 112, connection member 120 is swung forward and backward around pivot axis 122.

A coupler 140 (see FIG. 3 and FIGS. 4A-E) is provided for coupling and uncoupling needle support arm 130 with connection member 120 in function of a bale length measurement such that needle yoke 42 with needles 36 is in a fixed uncoupled position as long as the bale length is below a predetermined length, and such that the needle support arm 130 is coupled to swinging connection member 120 when a predetermined bale length is reached in order to swing needles 36 upward for performing knotting. In the illustrated embodiment the coupler 140 is a hook member 140 pivotally mounted around a pivot point 142. Pivot point 142 is fixedly connected to the needle support arm 130 through an attachment member 145. The hook member 140 is provided at a first end with a hook 146 (visible in FIGS. 4A, 4B and 4C) adapted to engage a pin 124 attached to connection member 120. A second end 141 of the hook member 140 is configured to cooperate with a trigger arm 153 of bale length measurement and trigger device 150. Trigger arm 153 is pivotally mounted around pivot point 154. Hook member 140 can be positioned in a first coupling position (FIG. 4B and FIG. 4C) in which the swinging connection member 120 engages the hook member 140 during swinging and in a second uncoupling position (FIGS. 4A and 4E) in which the swinging connection member does not engage the hook member 140 during swinging. Bale length measurement and trigger device 150 is configured to generate a first trigger (FIG. 4B, trigger arm 153 which has moved to the left, see further) which will position the hook member 140 in the first coupling position as the crank arm 112 is rotated (FIG. 4C), and a second trigger (FIG. 4D, trigger arm 153 which has moved to the right, see further) which will position the hook member 140 in the second uncoupling position as the crank arm 112 is rotated (FIG. 4E). The movement of trigger arm 153 from the coupling position to the uncoupling position is caused by the movement of needle yoke 42 and a trigger coupling device formed by interconnected rods 161, 163 and 169: when needle support arms 130 move, also rods 161, 163 and 169 move, pushing bale length measurement and trigger device 150 back in an uncoupling position in which trigger arm 153 is in the position illustrated in FIG. 4D and hook member 140 is uncoupled.

In prior art systems, in order to avoid that the needles break when there is an obstruction in the baling chamber, there is typically integrated a shear bolt between the PTO shaft and the drive mechanism for driving various baler components. In the illustrated embodiment, an option is to include a shear bolt in drive rod 110 and/or in pin 124.

Figure 4A:
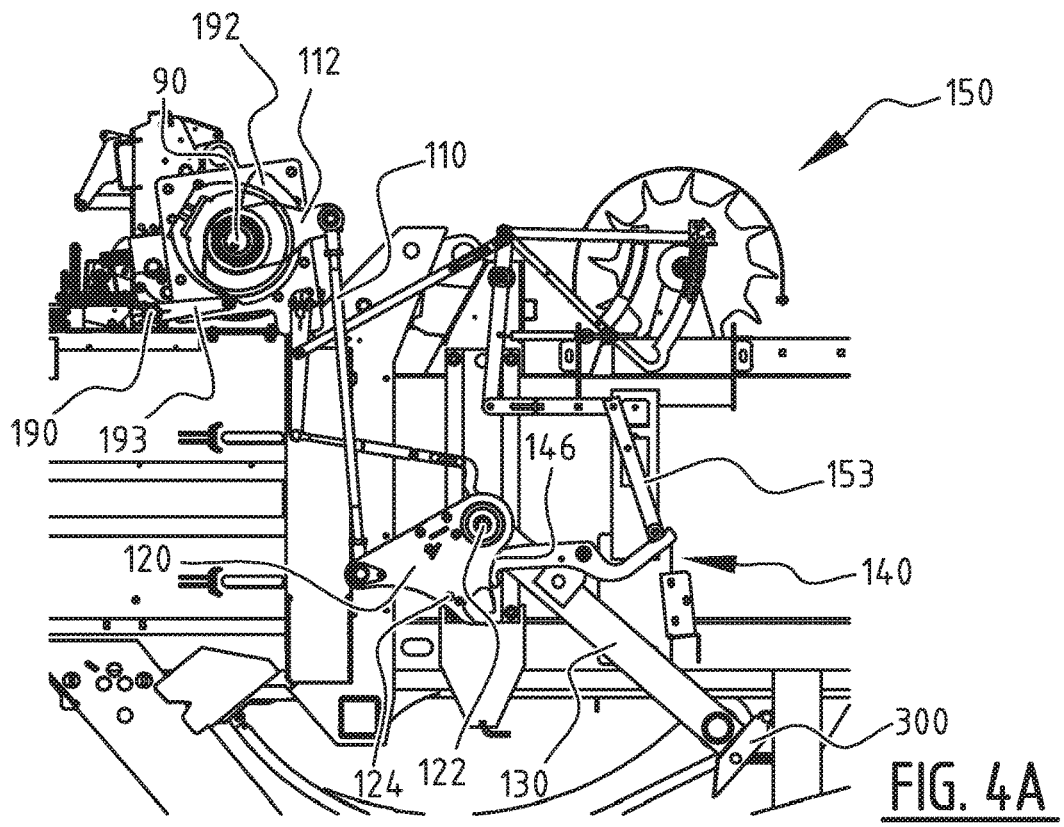
FIGS. 4A-4E illustrate consecutive positions of the various components of the needle drive mechanism of FIG. 2 during the driving of the needles.
Figure 4B:
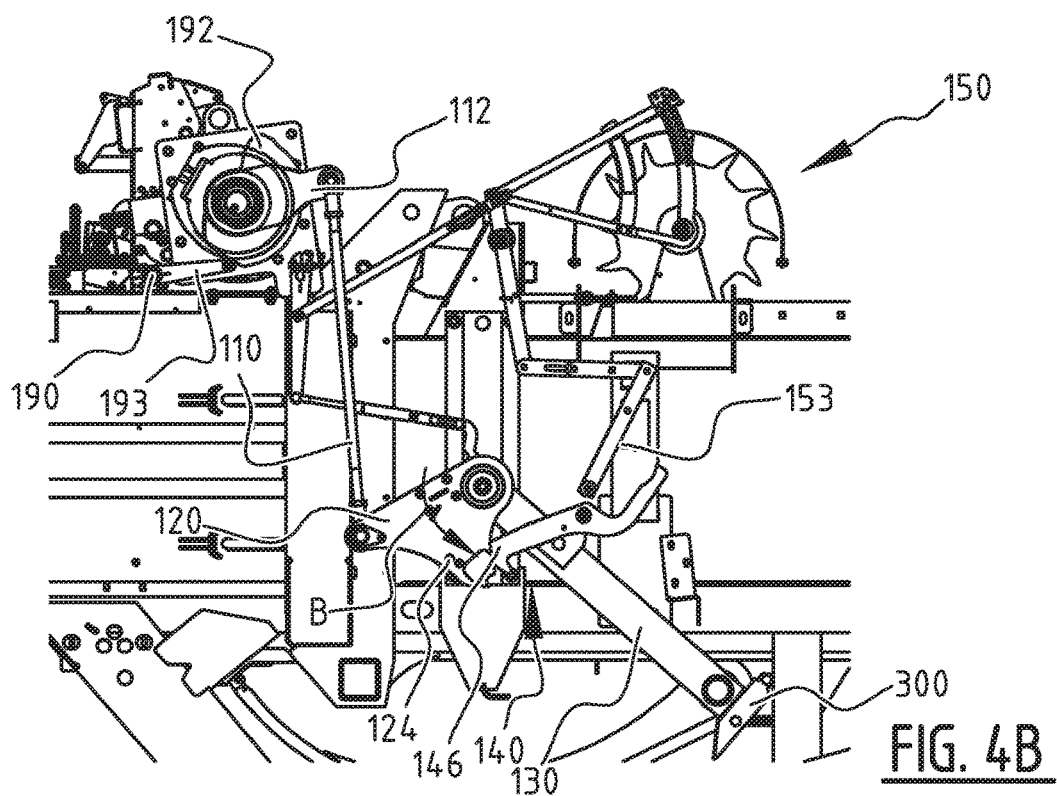
Figure 4C:
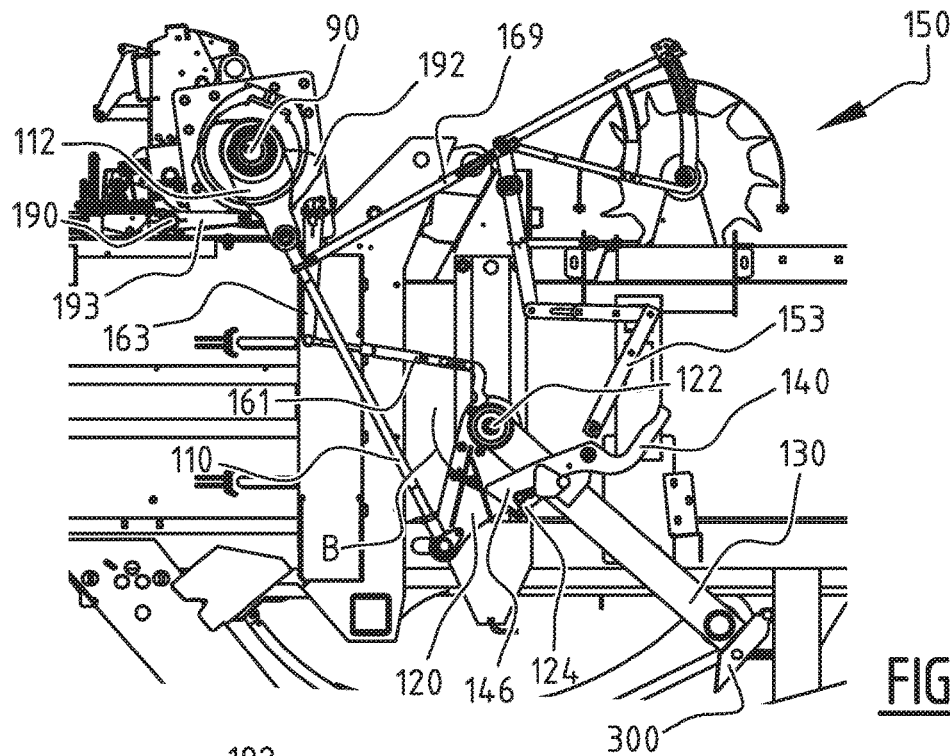
Figure 4D:
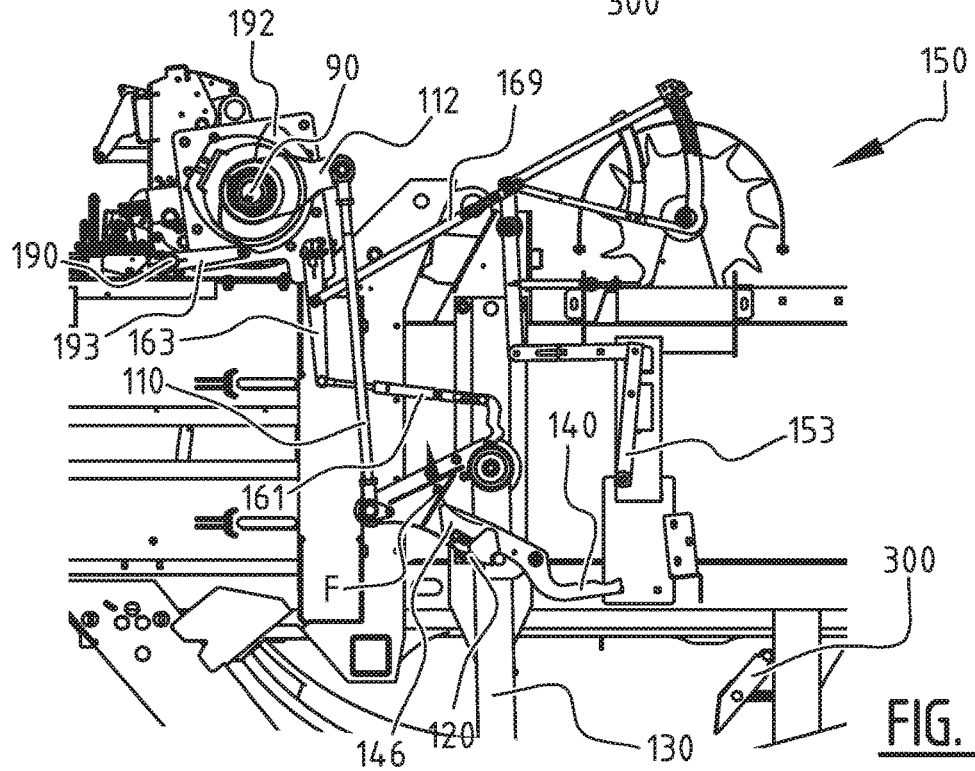
Figure 4E:
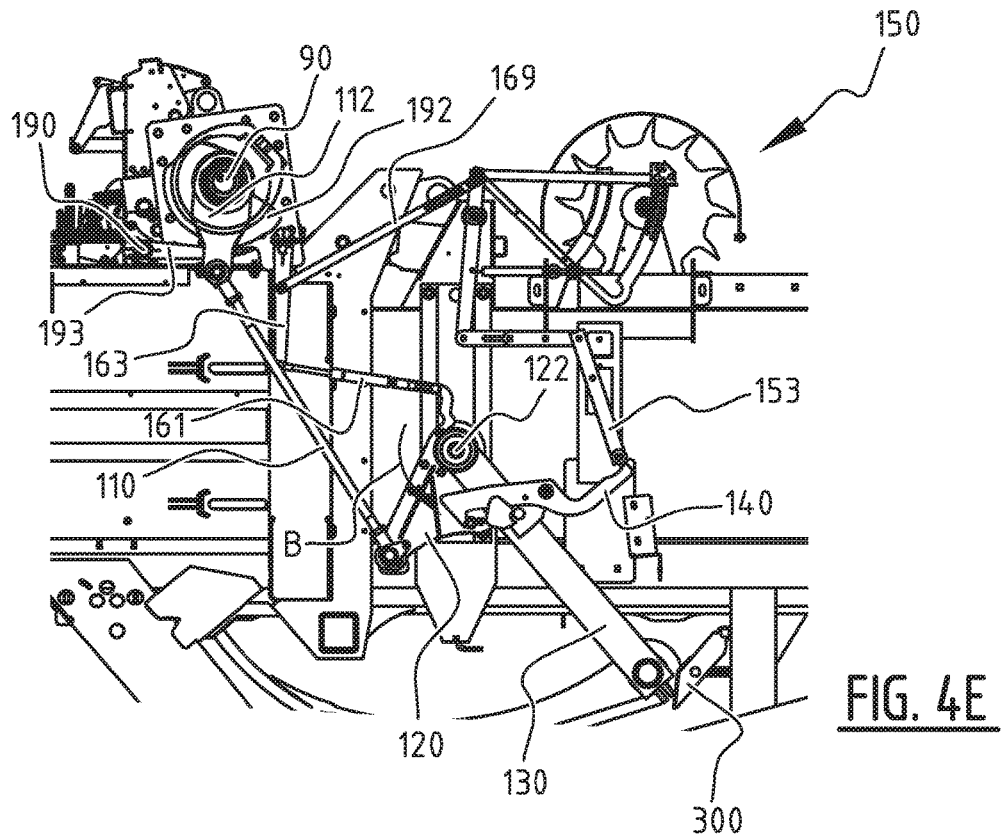
Figure 4F:
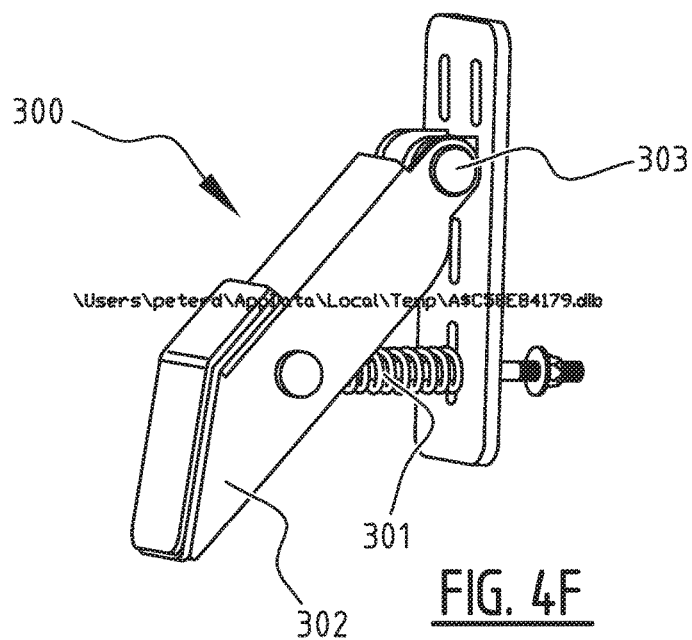
FIG. 4F is a detailed perspective view of the needle holding device shown in FIGS. 4A-4E.

To maintain the needles in the rest position (when the support arms 130 are in the uncoupled position), there is provided a holding device 300, see FIG. 4E and FIG. 4F. In the illustrated embodiment the holding device 300 comprises a compression spring 301 arranged for pressing against a holding element 302 which holds needle carrying rod 135 of needle yoke 42. The holding element 302 is pivotally mounted around pivot 303. When the hook 146 (see FIG. 4C) engages pin 124 bringing the hook member 140 in the coupling position, needle carrying rod 135 is removed from the holding element 302, i.e. the needle yoke 42 is released from the home position. This is made possible due to compression spring 301 which allows the holding element 302 to swing back and forward. When the hook 146 engages pin 124, the needle carrying rod 135 is pulled out of the holding element 302.

In the illustrated embodiment the holding device is a passive system in the sense that the needle yoke 42 is not actively released when needle movement is required. However, a skilled person understands that it is also possible to provide an active system releasing the needle yoke 42 upon reaching a predetermined bale length.

The operation of the needle coupling device 100 is illustrated in FIGS. 4A-4E. FIG. 4A shows the position of the trigger arm 153 before the predetermined bale length is reached. In this position trigger arm 153 maintains hook member 140 in a position in which hook 146 is not coupled to pin 124. In the illustrated embodiment the trigger arm is provided at an end with a wheel 152 which presses hook member 140 downward as long as the predetermined bale length is not reached. This corresponds with the situation in which the needles 36 are in a retracted stationary position. When the predetermined bale length is reached the bale length measurement and trigger device 150 swings the trigger arm 153 around pivot point 154 such that the hook member 140 is released and the hook 146 can engage pin 124 as the connection member 120 is pivoted backward by drive rod 110, see arrow B in FIG. 4B and FIG. 4C. Needle support arm 130 is now connected to the connection member 120 through hook 146 and the connection member 120 together with needle support arm 130 swings forward, see arrow F in FIG. 4D to move the needles 36 in the direction of the knotters 34 in order to deliver twine to the knotters 34. Next, trigger arm 153 is moved back to the uncoupling position. The movement of trigger arm 153 from the coupling position (FIGS. 4B and 4C) to the uncoupling position is caused by the movement of needles 130: when needles 130 have been rotated over a predetermined range, causing a movement of coupling rods 161, 163 and 169, bale length measurement and trigger device 150 is moved back in an uncoupling position in which trigger arm 153 is in the position illustrated in FIG. 4D and hook member 140 is uncoupled. When the connection member 120 is swung backward again, see arrow B in FIG. 4E the hook 146 is released and the needle support arm 130 is held again in the stationary retracted position.

Figure 9:
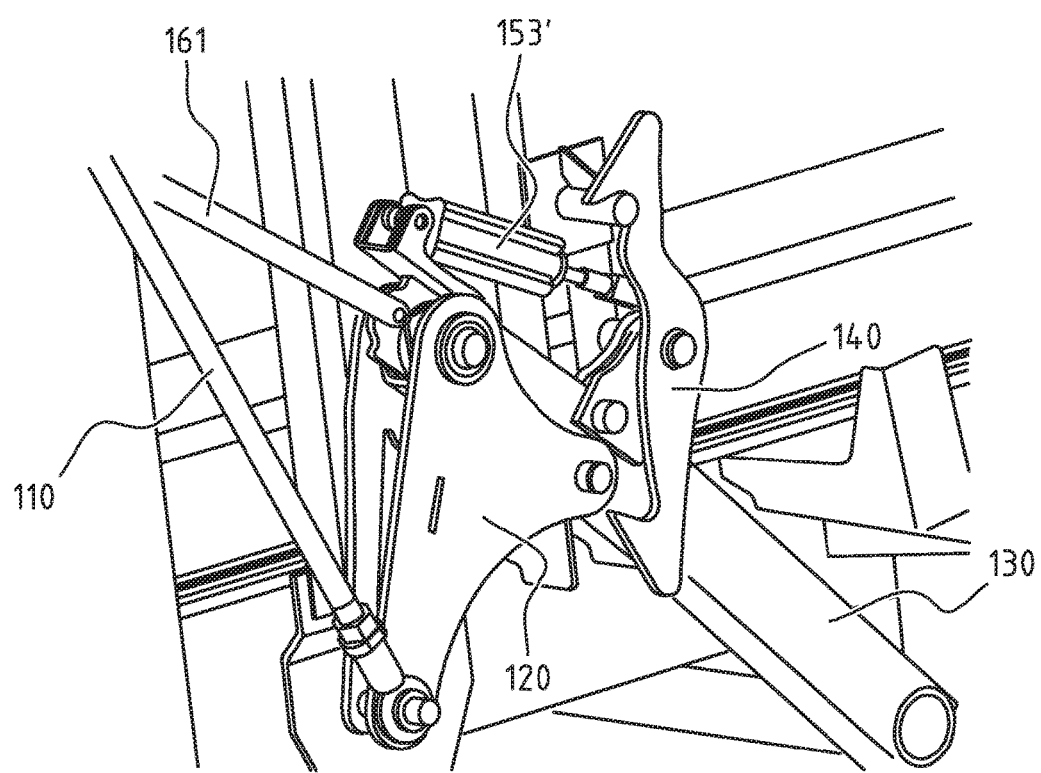
FIG. 9 is another schematic perspective view of an exemplary embodiment of a needle drive mechanism of a baler according to the present invention.

In a preferred embodiment bale length measurement and trigger device 150 comprises a star wheel 151 configured to rotate as a bale in the bale chamber 26 moves in a longitudinal direction L of baler 10, and a linkage assembly 155 coupled to star wheel 151. Linkage assembly 155 comprises the pivotally mounted trigger arm 153 arranged to trigger a movement of the coupler 140 from an uncoupled position to a coupled position and back. The figures show a particular embodiment of a linkage assembly 155 but the skilled person understands that many variants thereof are possible within the context of the present invention. In an alternative embodiment illustrated in FIG. 9, instead of a trigger arm 153 and linkage assembly, the bale length measurement and trigger system 150 may comprise an actuator 153' which pushes the hook member 140 downward when the desired bale length has been reached.

FIGS. 2, 3, 5, 5A, 6 and 6A further illustrate an embodiment of a knotter coupling device 160 between the driving shaft 90 and a drivable knotter shaft 180 on which a plurality of knotter discs of the plurality of knotters 34 (not shown in FIG. 6A for clarity purposes) are mounted. Knotter coupling device 160 is configured to couple the driving shaft 90 to the drivable knotter shaft 180 based on a position of the needle yoke 42. Knotter coupling device 160 illustrated in the drawings comprises a clutch 170, 167 between driving shaft 90 and knotter shaft 180, and a rod assembly 163, 164, 165, 166 configured for engaging the clutch 170, 167 such that the driving shaft 90 is coupled to the knotter shaft 180.

The knotter coupling device 160 comprises a pull rod 161, and a plurality of coupling members 163, 164, 165, 166, 167, 170, 181. Pull rod 161 has a first end pivotally connected to second end 132 of needle support arm 130. Pull rod 161 has a second end pivotally connected to a connection rod 163. The connection rod 163 is fixedly attached to a shaft portion 164 such that, when pull rod 161 is pulled, shaft portion 164 is rotated. The rotation of shaft portion 164 causes a locking block 165 on an arm 166 connected to shaft portion 164 to move downward releasing a lever 167. The lever 167 is pivotally connected to a knotter coupling part 181 which is attached to the knotter shaft 180 on which the one or more knotter discs (see further) are arranged. The continuously rotating driving shaft 90 is provided with a co-rotating coupling disc 170. One side of the coupling disc 170 is provided with a disc shaped recess 175 with a protrusion 172 protruding the in disc shaped recess 175. When lever 167 is released an end part 168 of lever 167 moves in the path of rotating protrusion 172, causing a co-rotation of knotter coupling part 180 connected to the shaft 181 on which the one or more knotter discs are arranged. In that manner a knotting cycle is initiated and is coordinated with the passing of the twine to the knotters 34 by the needles 36.

Figure 5:
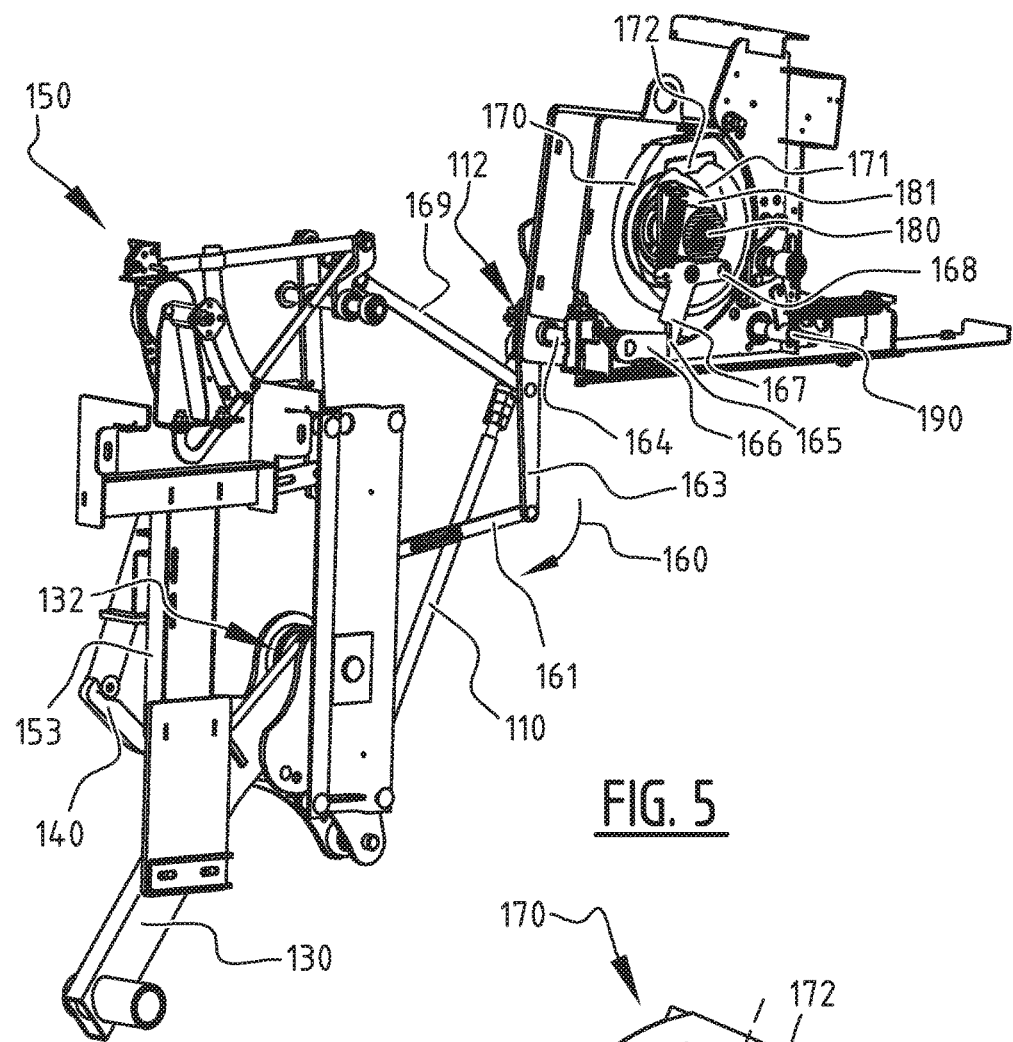
Figure 5A:
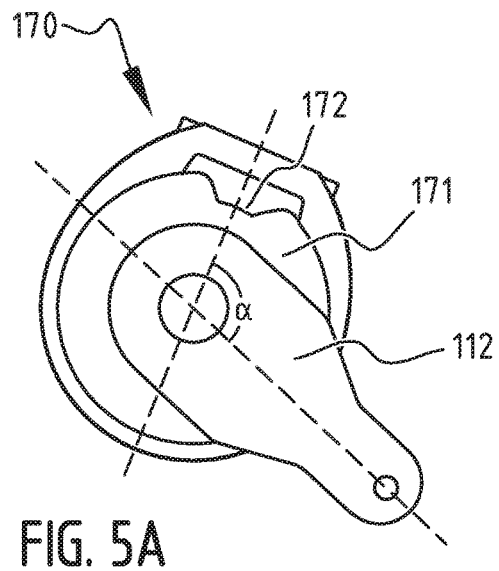

By setting the position of the co-rotating protrusion 172 with respect to the position of the co-rotating crank arm 112, i.e. by setting the angle α shown in the schematic drawing of FIG. 5A, the start of the knotter cycle with respect to the position of the needles 36 can be adjusted in a simple manner. The knotter functions can continue after the needles 36 have returned to their retracted home position allowing more time for the knotting function to take place, see further.

It is contemplated that some of the various pivot points may vary in their location and some may be coaxial, which are not shown as such in the illustrations. Conversely, some of the pivot points that are shown as being coaxial may have different locations.

Figure 7:
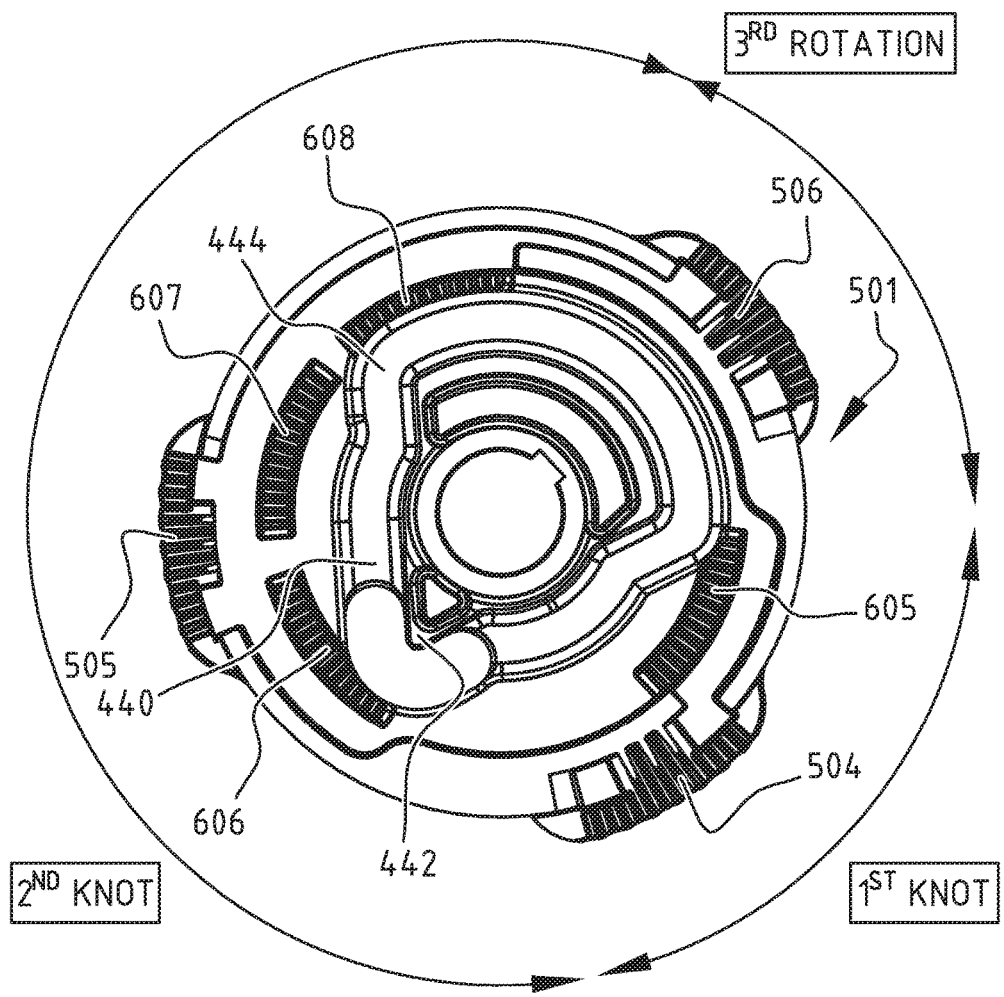
FIG. 7 is a schematic view of an exemplary embodiment of a knotter disc for use in a baler according to the present invention.
Figure 8:
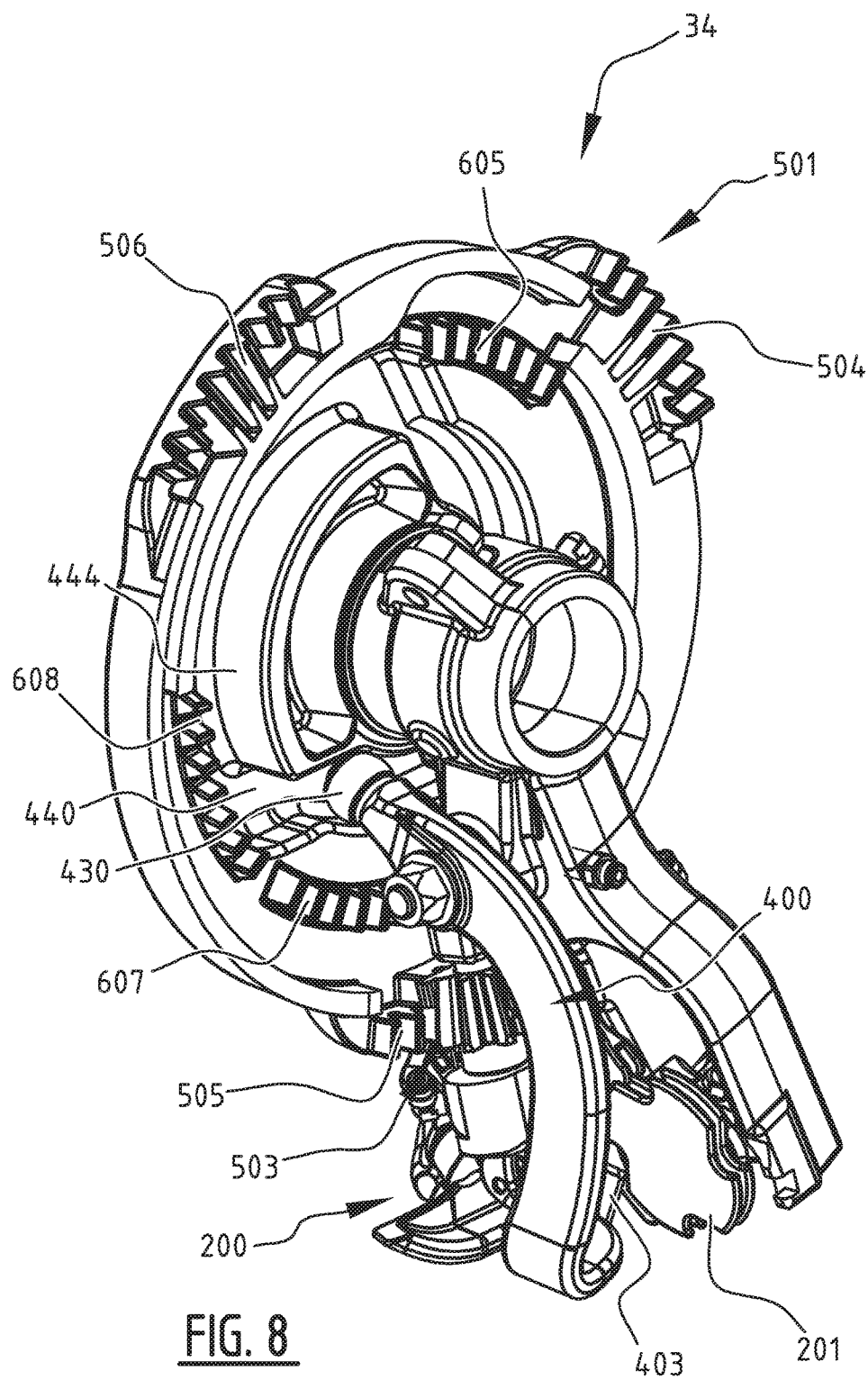
FIG. 8 is a schematic perspective view of an exemplary embodiment of a knotter for use in a baler according to the present invention.

FIGS. 7 and 8 illustrate an embodiment of a knotter 34. The knotter 34 comprises a knotter disc 501 that is intended to be secured to knotter shaft 180 illustrated in FIGS. 5 and 6 for co-rotation with the latter through one full revolution when the clutch 170, 167 is engaged. The knotter 34 further comprises a rotary billhook member 200, a twine disc 201 rearward of and adjacent to the billhook 200 for holding strands of twine in position for engagement by the billhook 200 during rotation of the latter; and a swing arm 400. The strands are held in notches in the rotating twine disc 201 by a retainer or twine holder (not shown in the figures). The swing arm 400 is provided with a knife blade 403 for severing the strands in response to a swinging movement of the arm 400 which also serves to bring a stripping part of the swing arm 400 in engagement with a knot formed on the billhook 200 for stripping such knot off of the billhook 200 whilst moving the swing arm from a backward position to a forward position. A detailed description of possible embodiments for the components 200, 201, and 400 can be found in WO2014/060245 and WO2015/014616 in the name of the applicant, which are included herein by reference.

In order to transmit driving power to the billhook 200, the knotter disc 501 is provided with a pinion 503 which is disposed for meshing engagement with three circumferentially spaced gear stretches 504, 505, 506 on the knotter disc 501. Similarly, driving power is transmitted to the discs of the twine disc 201, e.g. through a twine disc pinion, a worm gear drive and a bevel gear (not shown but described in WO2014/060245 and WO2015/014616) in position for sequential meshing engagement with a pair of circumferentially spaced gear sections 605, 606, 607, 608 on the knotter disc 501.

Power to swing the arm 400 is obtained through a cam follower 430 at the upper end of the arm swing 400. The cam follower 430 is within a cam track 440 on the knotter disc 501.

A tucker arm shaft 190 extends parallel to knotter shaft 180, see FIG. 6A and FIG. 1. The tucker arm shaft 190 fixedly carries a plurality of tucker arms 195. Each tucker arm 195 carries a roller 196 at its rearmost end around which a strand is entrained. A length of the strand may be looped upwardly around a plurality of slacker arms (not shown) disposed above the plurality of tucker arms 195.

When the needles 36 are moved upward, see the description above, the needles carry with it a strand. As the needles 36 approach the knotters 34, the tucker arms 195 are also moved upward. The tuckers arms 195 may be moved synchronously with the needles 36. This can be achieved through a tucker arm coupling system in the form of a cam system with a cam 192 co-rotating with drive shaft 90 and a cam roller 193 secured to tucker arm shaft 190, see FIG. 2 and FIG. 4A-4E. The tucker arms 195 rock upwardly to provide the slack necessary in the strand to accommodate the needle movement. The tip of each needle 36 snares the strand delivered by the corresponding tucker arm 195 and presents the strand delivered by the needle 36 together with the strand delivered by the corresponding tucker arm 195 in unison to the knotter 34. See also FIG. 6C of WO2015/014616 and the corresponding description.

The movement of the billhook 200 and the twine disc 201 for performing the first knot during a first knot forming cycle are brought about by operable inter-engagement of the gear stretch 504 and gear section 605 on the knotter disc 501 with their respective gears (pinion 53 and bevel gear (not shown)) on the billhook 200 and the twine disc 201. Such driving inter-engagement continues until a first knot has been formed on the billhook 200, by which time the needle 36 has begun to withdraw. At this point, a cam shoulder 442 of the cam track 440 of the knotter disc 501 comes into engagement with the swing arm 400 so as to swing the bottom of the latter, and hence the knife 403, across that portion of the strands between the billhook 200 and the twine disc 201, thereby severing the same. At the moment of cutting, the strands extend from the billhook 200 towards the twine disc 201. To complete the first knot formation, the stripping part of the swing arm 400 engages the strands which are retained in a twisted manner around the billhook 200. In so doing, the strand parts lying on top of the upper lip of the billhook 200 are pulled over the strand parts extending in between the upper and lower lips of the billhook 200, thereby forming the first knot. Since the free ends of the strands are very short, they are pulled completely through the knot during its final formation, resulting in the so-called conventional knot. Besides completing the knot, further motion of the arm 400 also strips the finished first knot completely from the billhook 200 and drops the completed loop on the bale.

When the first knot is dropped, cut strands are still retained in a notch of the twine disc 201. As the needle 36 continues to retract, the strand associated with the needle 36 is draped downwardly across the bale chamber 26 thereby pushing the upper lip of the billhook 200 down, while the tucker arm 195 lowers to its normal position. The strands are now in position for initiating the second tying cycle. The swing arm 400 ensures that the strands are properly positioned across and in engagement with the billhook 200, whereupon the latter and the twine disc 201 are operated by their second respective gear stretch 505 and gear sections 606, 607, 608 on the knotter disc 501. Once the second knot becomes formed, the arm 400 is once again actuated, but this time by the second cam shoulder 444 resulting in an improved stripping of the second knot.

Gear sections 606, 607, 608 provide a prolonged operation of the twine disc 201, so that the twine disc rotates over approximately 270 degrees during the second knot forming cycle. More in particular, in a first rotation period of approximately 90° of the second knot forming cycle, the second knot is formed by the rotation of the billhook 200. In a second rotation period of approximately 90° of the second knot forming cycle, the second knot is stripped of the billhook 200. The third rotation of approximately 90° is needed to return to the correct starting position for forming next knot. This prolonged rotation will result in the strands being no longer retained between the twine disc 201 and the twine holder. Finally a third gear stretch 506 on the knotter disc 501 causes the billhook 200 to perform a third rotation. The cam shoulder 444 extends over a part of the circumference, so as to create a large shoulder which keeps the knife arm 403 in its furthest extended position after removal of the second knot of the billhook 200. Pinion 503 will now engage gear stretch 506 and continue to rotate while the upper lip of the billhook 200 is forced to open. By keeping the swing arm 400 in its furthest position and continuing to rotate the billhook 200, it is made sure that the strands can be properly removed and do not remain attached to the billhook 200.

Because the free ends of the strands are typically considerably longer than the free ends obtained during the first knot formation, upon finalizing the second knot, free ends no longer are pulled completely out of the knot, resulting in a so-called loop-knot. However, depending on the design of the various components it is also possible to have a second conventional knot. This second knot is the start of a new bight for the next bale. Such bight is in position to receive new material that is packed into the bale chamber by the plunger, and the bight grows in length as additional lengths of the strands are simultaneously pulled from their sources. Finally, when the bale has reached its desired size, the sequence returns to its starting point.

Using an exemplary embodiment of the needle coupling device 100 and the knotter coupling mechanism 160, the following advantages may be achieved. The needle coupling device 100 ensures that the needles 36 move up the lower and the upper twine into the knotter 34, when the desired bale length is reached. Then, through the knotter coupling mechanism 160, at the right time the knotter discs 501 begin to rotate. Compared to prior art knotters exemplary embodiments of the invention include a major change to the drive line of the knotters 34, in the sense that the needles 36 must come up before the knotter discs 501 begin to rotate. At the beginning of the knotter cycle, like a standard knotter, the first knots are made. The knotter discs 501 continue to rotate and the second knot is made (loop knot or standard knot, depending from the twine disc and the other knotter parts).

The knotter discs 501 continue to rotate and a third billhook rotation is made. In that manner it is ensured that the billhook 200 opens because just like for the first and the second rotation, wherein the billhook is pushed open on a billhook cam follower (not visible in FIG. 8, the description of a billhook cam follower is included by reference to WO2014/060245 and WO2015/014616). In that manner it is guaranteed that the second knot is released out of the billhook 200. Using such a configuration, the billhook tension does not have to be a compromise anymore. The tension can be set sufficiently hard to achieve a perfect first knot and a perfect second knot, whilst avoiding the risk that the second knot stays on the billhook 200.

Whilst the principles of the invention have been set out above in connection with specific embodiments, it is to be understood that this description is merely made by way of example and not as a limitation of the scope of protection which is determined by the appended claims.

The invention claimed is:

1. A baler comprising:
  a bale chamber;
  a plunger configured to compress crop material in the bale chamber in order to form a bale;
  a needle yoke comprising a plurality of needles configured to deliver twine through the bale chamber;
  a plurality of knotters configured to receive the twine from the plurality of needles;
  a bale length measurement and trigger device configured to measure a length of the bale in the bale chamber and to generate a trigger when a predetermined length is reached;
  a driving shaft located above the bale chamber and extending in a traverse direction of the baler;
  a gear box configured to continuously rotate the driving shaft when the baler is in operation; and
  a needle coupling device between the driving shaft and the needle yoke, the needle coupling device configured for moving the needle yoke from a rest position to a twine delivery position and back when the bale length measurement and trigger device generates a trigger, the needle coupling device comprising:
    a crank arm attached to the driving shaft and co-rotating with the driving shaft; and
    a plurality of coupling members positioned between the crank arm and the needle yoke, the plurality of coupling members configured for establishing an uncoupling and a coupling between the crank arm and the needle yoke when the bale length measurement and trigger device generates a trigger.

2. The baler of claim 1, wherein the needle yoke further comprises:
  two needle support arms each having a first end and a second end; and
  a needle carrying rod extending in a transverse direction of the baler and carrying the plurality of needles,
  wherein the needle carrying rod is mounted between the first ends of the needle support arms, and
  wherein the second ends of the needle support arms are pivotally mounted around a fixed pivot axis extending in the transverse direction of the baler.

3. The baler of claim 2, wherein the plurality of coupling members comprises:
  a drive rod having a first end pivotally connected to the crank arm and a second end;
  a connection member pivotally mounted at a first location around a first fixed pivot axis extending in a transverse direction of the baler, and pivotally connected at a second location to the second end of the drive rod, such that in operation the connection member is swung back and forward around the first fixed pivot axis by the drive rod; and a coupler configured to couple the connection member to the needle yoke upon receipt of a trigger, wherein the first fixed pivot axis of the connection member corresponds with the fixed pivot axis of the second ends of the needle support arms.

4. The baler of claim 1, wherein the plurality of coupling members comprises:

a drive rod having a first end pivotally connected to the crank arm and a second end;

a connection member pivotally mounted at a first location around a first fixed pivot axis extending in a transverse direction of the baler, and pivotally connected at a second location to the second end of the drive rod, such that in operation the connection member is swung back- and forward around the first fixed pivot axis by the drive rod; and a coupler configured to couple the connection member to the needle yoke upon receipt of the trigger.

5. The baler of claim 4, wherein the coupler is a hook member which is pivotally attached to the needle yoke and which is positionable in a first coupling position in which the connection member engages the hook member during swinging and in a second uncoupling position in which the connection member does not engage the hook member during swinging, and wherein the bale length measurement and trigger device is further configured to generate a first trigger which positions the hook member in the first coupling position when a predetermined length is reached, and a second trigger which positions the hook member in the second uncoupling position.

6. The baler of claim 5, further comprising a trigger coupling device between the connection member and the bale length measurement and trigger device, the trigger coupling device configured to cause the bale length measurement and trigger device to generate the second trigger.

7. The baler of claim 5, wherein the bale length measurement and trigger device comprises:

a star wheel configured to rotate as the bale in the bale chamber moves in a longitudinal direction of the baler; and a linkage assembly coupled to the star wheel, the linkage assembly comprising a pivotally mounted trigger arm arranged to trigger a movement of the coupler from an uncoupled position to a coupled position and back.

8. The baler of claim 1, further comprising a needle holding device configured to hold the needle yoke in the rest position and to allow the needle yoke to be released when movement from the rest position to the twine delivery position and back is required.

9. The baler of claim 1, further comprising:

a driveable knotter shaft coupled to the plurality of knotters; and a knotter coupling device between the driving shaft and the driveable knotter shaft, the knotter coupling device configured to couple the driving shaft to the driveable knotter shaft based on a position of the needle yoke.

10. The baler of claim 9, wherein the needle yoke further comprises:

two needle support arms each having a first end and a second end; and a needle carrying rod extending in a transverse direction of the baler and carrying the plurality of needles, wherein the needle carrying rod is mounted between the first ends of the needle support arms, wherein the second ends of the needle support arms are pivotally mounted around a fixed pivot axis extending in the transverse direction of the baler, and wherein the knotter coupling device comprises:

a clutch between the driving shaft and the knotter shaft; and a rod assembly comprising a rod connected to at least one of the two needle support arms of the needle yoke, the rod assembly configured for engaging the clutch such that the driving shaft is coupled to the knotter shaft.

11. The baler of claim 9, wherein each knotter comprises:

a knotter disc secured to the driveable knotter shaft; and a billhook.

12. The baler of claim 11, wherein for each knotter:

the knotter disc comprises a first gear stretch, a second gear stretch, and a third gear stretch, the billhook comprises a billhook gear configured for cooperating with the first, second, and third gear stretches, and the first, second, and third gear stretches of the knotter disc are circumferentially spaced in order for the billhook to perform a first rotation during a first knot forming cycle, a second rotation during a second knot forming cycle, and a third rotation.

13. The baler of claim 12, wherein for each knotter:

the each knotter further comprises a twine disc configured for holding strands of twine in position for engagement by the billhook during rotation of the billhook, the knotter disc comprises a plurality of gear sections, the twine disc comprises a twine disc gear configured for cooperating with the plurality of gear sections of the knotter disc, the plurality of gear sections are circumferentially spaced in order for the twine disc to perform a first rotation during the first knot forming cycle and a second rotation which is longer than the first rotation during the second knot forming cycle, and the each knotter further comprises:

a swing arm with a knife blade for severing strands in response to a swinging movement of the swing arm, the swing arm comprising a cam adapted for following a cam track of the knotter disc, the cam track being adapted for performing a first swing during the first rotation and a second swing during the second and third rotation; and a stripping part for stripping of a knot off of the billhook during the swinging movement of the swing arm.

14. A baler comprising:

a bale chamber;

a plunger configured to compress crop material in the bale chamber in order to form a bale;

a needle yoke comprising a plurality of needles configured to deliver twine through the bale chamber;

a plurality of knotters configured to receive the twine from the plurality of needles;

a bale length measurement and trigger device configured to measure a length of the bale in the bale chamber and to generate a trigger when a predetermined length is reached;

a driving shaft located above the bale chamber and extending in a traverse direction of the baler; and a needle coupling device between the driving shaft and the needle yoke, the needle coupling device comprising:

a crank arm attached to the driving shaft and co-rotating with the driving shaft; and a plurality of coupling members between the crank arm and the needle yoke, the plurality of coupling members configured for being brought from an uncoupled position in which the crank arm is not connected to the needle yoke to a coupled position in which the crank arm and the needle yoke are coupled when the bale length measurement and trigger device generates a trigger.

15. The baler of claim 14, further comprising a gear box coupled with the driving shaft, the gear box configured to continuously rotate the driving shaft when the baler is in operation.

16. The baler of claim 14, wherein the plurality of coupling members comprises:

a drive rod having a first end pivotally connected to the crank arm and a second end;

a connection member pivotally mounted at a first location around a first fixed pivot axis extending in a transverse direction of the baler, and pivotally connected at a second location to the second end of the drive rod such that, in operation the connection member is swung back- and forward around the fixed pivot axis by the drive rod; and a coupler configured to couple the connection member to the needle yoke upon receipt of the trigger.

17. The baler of claim 16, wherein the first fixed pivot axis of the connection member corresponds with the fixed pivot axis of the second ends of the needle support arms.

18. The baler of claim 16, wherein the coupler is a hook member which is pivotally attached to the needle yoke and which is positionable in a first coupling position in which the connection member engages the hook member during swinging and in a second uncoupling position in which the connection member does not engage the hook member during swinging, and wherein the bale length measurement and trigger device is further configured to generate a first trigger which positions the hook member in the first coupling position when a predetermined length is reached, and a second trigger which positions the hook member in the second uncoupling position.

19. The baler of claim 14, wherein the needle yoke comprises:

two needle support arms each having a first end and a second end; and a needle carrying rod extending in a transverse direction of the baler and carrying the plurality of needles, wherein the needle carrying rod is mounted between the first ends of the needle support arms, and wherein the second ends of the needle support arms are pivotally mounted around a fixed pivot axis extending in the transverse direction of the baler.

20. A baler comprising:

a bale chamber;

a plunger configured to compress crop material in the bale chamber in order to form a bale;

a needle yoke comprising:

a plurality of needles configured to deliver twine through the bale chamber;

two needle support arms each having a first end and a second end, the second ends pivotally mounted around a fixed pivot axis extending in a transverse direction of the baler; and a needle carrying rod extending in the transverse direction of the baler and carrying the plurality of needles, the needle carrying rod mounted between the first ends of the needle support arms;

a plurality of knotters configured to receive the twine from the plurality of needles;

a bale length measurement and trigger device configured to measure a length of the bale in the bale chamber and to generate a trigger when a predetermined length is reached;

a driving shaft located above the bale chamber and extending in a traverse direction of the baler;

a needle coupling device positioned between the driving shaft and the needle yoke and the needle coupling device configured for establishing an uncoupling and a coupling between the driving shaft and the needle yoke, the needle coupling device configured for moving the needle yoke from a rest position to a twine delivery position and back, when the bale length measurement and trigger device generates a trigger;

a driveable knotter shaft coupled to the plurality of knotters; and a knotter coupling device between the driving shaft and the driveable knotter shaft, the knotter coupling device configured to couple the driving shaft to the driveable knotter shaft based on a position of the needle yoke, the knotter coupling device comprising:

a clutch between the driving shaft and the driveable knotter shaft; and a rod assembly comprising a rod connected to at least one of the two needle support arms of the needle yoke, the rod assembly configured for engaging the clutch such that the driving shaft is coupled to the driveable knotter shaft.

* * * * *